United States Patent [19]
Duling et al.

[11] 3,895,068
[45] July 15, 1975

[54] BICYCLIC METHYLENE KETONES

[75] Inventors: Irl N. Duling, West Chester; Gary L. Driscoll, Boothwyn, both of Pa.

[73] Assignee: Sun Research and Development Company, Marcus Hook, Pa.

[22] Filed: Aug. 30, 1968

[21] Appl. No.: 756,604

[52] U.S. Cl......... 260/586 G; 106/243; 260/63 UY; 260/468 G; 260/476 R; 260/488 R; 260/617 R
[51] Int. Cl............................................. C07c 49/44
[58] Field of Search ............................... 260/586 A

[56] References Cited
UNITED STATES PATENTS
3,468,950  9/1969  Chow et al................ 260/586 A X OTHER PUBLICATIONS
Buchta et al., "Ann. Chem." Vol. 692, pp. 42–52 (1966).
Stetter et al. I, "Chem. Abstracts", Vol. 57, p. 5817d, (1962).
Stetter et al. II, "Berichte" Vol. 96, pp. 694–698, (1963).

*Primary Examiner*—Leon Zitver
*Assistant Examiner*—Norman Morgenstern
*Attorney, Agent, or Firm*—George L. Church; Donald R. Johnson; Anthony J. Dixon

[57] ABSTRACT

5-Methylene-1-ketobicyclo[3.3.1]nonane, and alkyl substituted 5-methylene-1-ketobicyclo[3.3.1]nonanes are produced by the pyrolysis of compounds having the formula:

HO — A — B wherein A represents a hydrocarbon moiety consisting 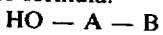 of the adamantane nucleus with 0–3 alkyl substituents; wherein B is a bridgehead substituent from the group consisting of hydroxy, chloro, bromo and

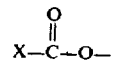

in which X is hydrogen, alkyl, aryl or alicyclic; and wherein OH is a bridgehead substituent.

16 Claims, 1 Drawing Figure

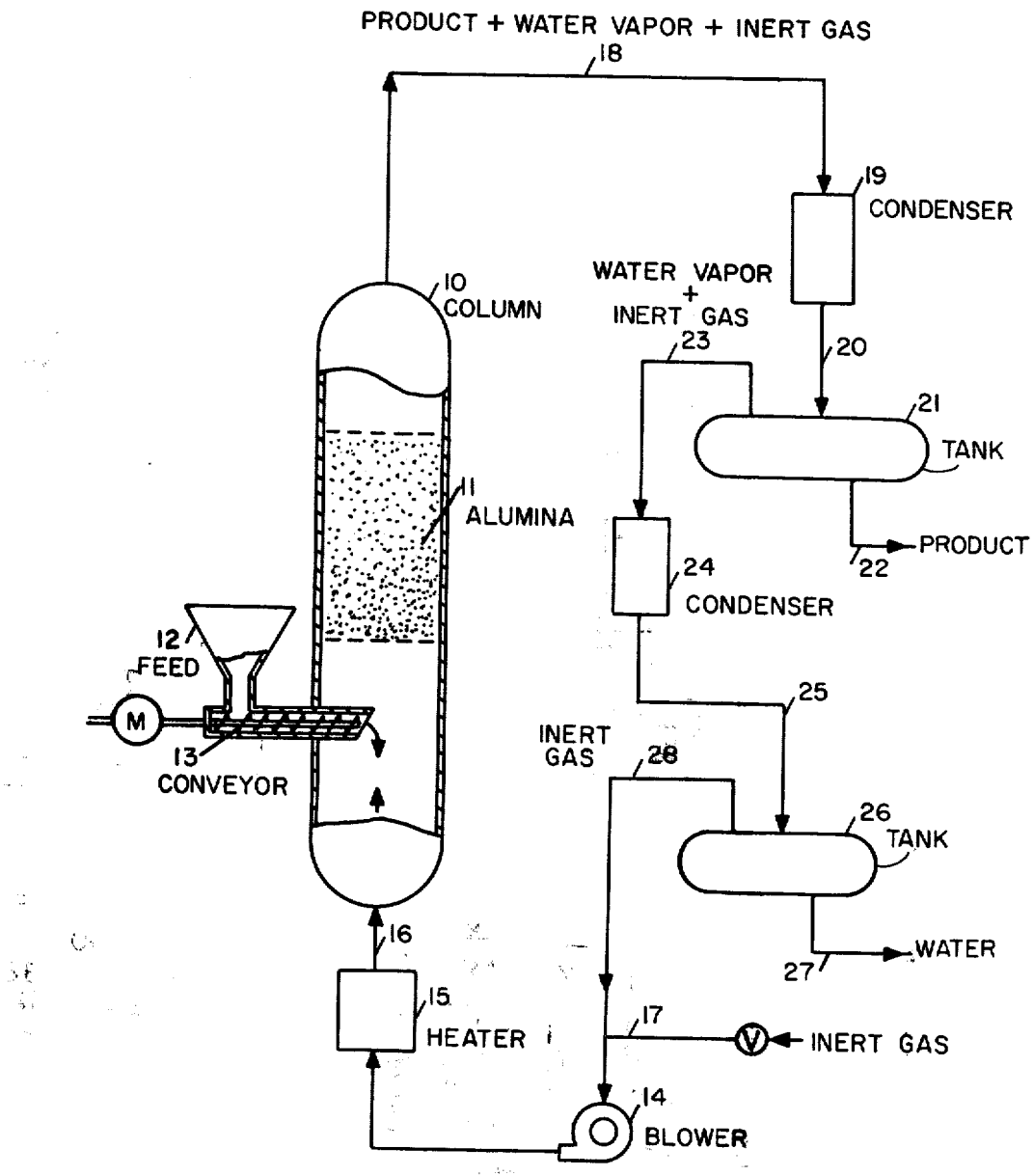

BICYCLIC METHYLENE KETONES

BACKGROUND OF THE INVENTION

This invention relates to the conversion of certain types of difunctional adamantane derivatives having at least one bridgehead hydroxy substituent into compounds having a 5-methylene-1-ketobicylco[3.3.1]nonane structure.

The cage-like structure of the adamantane nucleus has been illustrated in several ways, of which the following is one example:

As can be seen, it consists of three condensed cyclohexane rings arranged so that there are four brigehead carbon atoms which are equivalent to each other.

Structure of the compound, 5-methylene-1-ketobicyclo-[3.3.1]nonane can be illustrated as follows:

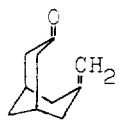

The preparation of methyl- and/or ethyl-substituted adamantanes by the isomerization of tricyclic naphthenes by means of an aluminum halide or HF-BF$_3$ catalyst has been described by several references including the following: Schneider U.S. Pat. No. 3,128,316, dated Apr. 7, 1964; Janoski et al. U.S. Pat. No. 3,275,700, dated Sept. 27, 1966; Schleyer et al., Tetrahedron Letters No. 9, pps. 305-309 (1961); and Schneider et al., JACS, Vol. 86, pps. 5365-5367 (1964). The isomerization products can have the methyl and/or ethyl groups attached to the adamantane nucleus at either bridgehead or nonbridgehead positions or both, although completion of the isomerization reaction favors bridgehead substitution. Examples of alkyladamantanes made by such isomerization are methyladamantanes, dimethyladamantanes, ethyladamantanes, methylethyladamantanes, dimethylethyladamantanes, trimethyladamantanes and tetramethyladamantanes.

Preparation of adamantane hydrocarbons having higher alkyl groups has been disclosed by Spengler et al., Erdol and Kohle-Erdgas-Petrochemie, Vol. 15, pps. 702-707 (1962). These authors used a Wurtz synthesis involving the reaction of 1-bromoadamantane with alkali metal alkyls to interchange the alkyl group for the bromine substituent. In this manner 1-n-butyladamantane and 1-n-hexyladamantane were prepared.

Hoek et al., 85, (1966) Recueil 1045-1053, have described a different route for the preparation of butyl-substituted adamantane. The procedure involved reacting either 1-bromoadamantane or 2-bromoadamantane with thiophene using SnCl$_4$ as catalyst in the presence of excess thiophene as solvent to produce adamantyl thiophenes and then hydrogenating the adamantyl thiophenes to yield butyl-substituted adamantanes.

1,3-Dihydroxyadamantane and corresponding alkyladamantanes have various sources. For instance, see Schneider U.S. Pat. No. 3,356,741, dated Dec. 5, 1967 and Moore U.S. Pat. No. 3,383,424, dated May 14, 1968.

The corresponding mono

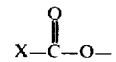

derivatives can be obtained by the partial esterification of the dihydroxy compounds, using the corresponding acids or anhydrides or acid halides and conventional means. Examples of X besides hydrogen are alkyl groups such as methyl, ethyl, propyl, butyl, pentyl, hexyl, heptyl, octyl, nonyl, and decyl including isomers thereof, aryl groups such as phenyl, tolyl and xylyl, cyclohexyl, and cycloalkyl groups such as methylcyclohexyl, dimethylcyclohexyl and tetramethylcyclohexyl.

The corresponding monochloro and monobromo derivatives can be obtained from the dihydroxy compounds by the process described and claimed in Moore and Driscoll copending application U.S. Ser. No. 784,480, filed Dec. 17, 1968 now U.S. Pat. No. 3,819,721. This procedure involves dissolving the dihydroxy compound in fuming sulfuric acid and reacting same with an equimolar amount of an inorganic halide such as an alkali metal chloride or bromide.

As an example of the latter process 1,3-dihydroxy-5,7-dimethyladamantane (19.6 grams = 0.1 mole) is dissolved in a cold mixture of 96% sulfuric acid (50 ml.) and 20% fuming sulfuric acid (50 ml.). Sodium bromide (10.3 grams = 0.1 mole) is added and the mixture is stirred for 15 minutes. The mixture is poured over ice and stirred until the ice melts. The resulting solid mixture is filtered from the aqueous layer and thoroughly washed with water. The solid mixture is extracted with hexane to remove any 1,3-dibromo-5,7-dimethyladamantane formed. It is then extracted with ether to dissolve the desired 1-bromo-3-hydroxy-5,7-dimethyladamantane which is recovered by evaporating the solvent.

To obtain the corresponding chloro derivative, sodium chloride can be substituted for sodium bromide. Also HBr and HCl can be employed in place of their corresponding salts, the latter including as useful not only the sodium salts but also alkali metal and alkaline earth metal salts generally, and particularly the potassium salts.

The process of the invention is characterized by versatility of choice of starting material, by ease of operation, and by yielding a simplified reaction mass comprising typically the desired product and either water or acid, together with, if any, unreacted starting material.

SUMMARY OF THE INVENTION

The invention resides in a process for producing 5-methylene-1-ketobicyclo[3.3.1]nonane and alkyl-substituted 5-methylene-1-ketobicyclo[3.3.1]nonanes by the pyrolysis of compounds having the formula:

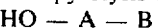

wherein A represents a hydrocarbon moiety consisting of the adamantane nucleus with 0-3 alkyl substituents containing a total of not more than 20 alkyl carbon atoms, preferably 0-10 carbon atoms; wherein B is a bridgehead substituent from the group consisting of hydroxy, chloro, bromo and

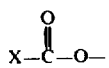

in which X is hydrogen or alkyl, aryl or cycloalkyl, each such X when hydrocarbyl having not more than 10 carbon atoms, preferably not more than 7 carbon atoms; and wherein HO— is a bridgehead substituent; remaining substituents on A being hydrogen.

The hydrocarbon moiety A of the foregoing starting material compounds can correspond to adamantane with unsatisfied valences at the 1 and 3 positions, or to an alkyladamantane having 1–3 alkyl groups and 11–30 total carbon atoms (1–20 total alkyl carbon atoms), also with unsatisfied valences at the 1 and 3 positions.

The alkyl group or groups, when present, and taken individually, can be attached to the adamantane nucleus at either a bridgehead or a nonbridgehead position.

Preferably the hydrocarbon moiety A has a total of 0–10 alkyl carbon atoms. Also it is preferred that the hydrocarbon moiety A contain just two alkyl groups, each having 1 or 2 carbon atoms, and each occupying a bridgehead position.

Examples of starting material compounds in the practice of the invention are the relevant derivatives of the following hydrocarbons: adamantane; 1-methyl or 2-methyladamantane; 1-ethyl or 2-ethyladamantane; 1,2-dimethyl or 1,3-dimethyladamantane; 1-methyl-3-ethyladamantane; diethyladamantanes; 1-n-propyl or 1-isopropyladamantane; 1-n-butyladamantane; 1,3-di-n-pentyladamantane; 1-methyl-3-heptyladamantane; 1-n-decyladamantane; 1-n-decyl-3-ethyladamantane; 1-methyl-2-propyladamantane; 1-isohexyladamantane; 1-eicosyladamantane; and the like.

Temperature conditions maintained during the pyrolysis generally should be in the range of 150°–750°C. and follow the well-known rule that, other conditions remaining the same, they should be sufficiently high for the reaction to take place, preferably at a reasonable rate, and not so high as to result largely in unwanted decomposition products, preferably not significantly in such products. When the reaction is carried out in the presence of a contact mass and especially one that exerts substantial catalytic effect, lower temperatures generally can be used than when the pyrolysis reaction is effected in the absence of such contact mass.

The products of the process of the invention find utility as intermediates in the preparation of a wide variety of useful end products. For instance, 5-methylene-1-ketobicyclo-[3.3.1]nonane as such, or in alkyl-substituted form as herein described, finds utility in the preparation of polyethers by treatment with acids in inert solvents to yield a thermally stable film-forming polymer useful for high temperature electrical insulation.

The susceptibility of these ketobicyclo products to oxidation and polymerization, and the control afforded herein as to their composition, makes them of particular utility in the formulation of coating compositions, such as paints, making them superior to drying oils in many respects, the latter being comprised of vegetable compounds containing unsaturated mixed glycerides, along with, in many instances, saturated mixed compounds, over which oils selectivity control as to overall composition is hardly readily available. The products of the invention are particularly active at the methylene double bond, which in addition makes them capable of responding readily to driers.

BRIEF DESCRIPTION OF THE DRAWING

The accompanying drawing schematically illustrates a system for practicing the present process, involving a reaction tower containing a contact mass and auxiliary means for feeding the necessary materials thereto and for recovering the reaction product. The reaction tower and feed means are shown in elevational view partly in section.

DESCRIPTION OF THE INVENTION

The pyrolysis reaction which occurs when B in the feed material is hydroxy can be illustrated as follows:

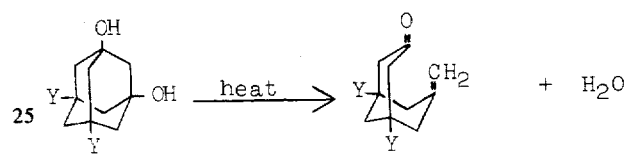

wherein Y is hydrogen or alkyl.

When B is

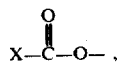

such as, acetoxy, the analogous typical equation becomes:

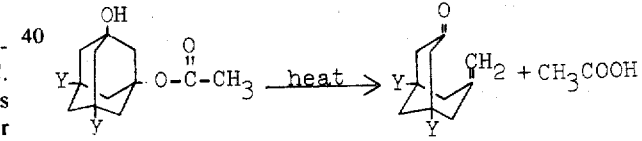

When B is halo, such as chloro, the analogous typical equation becomes:

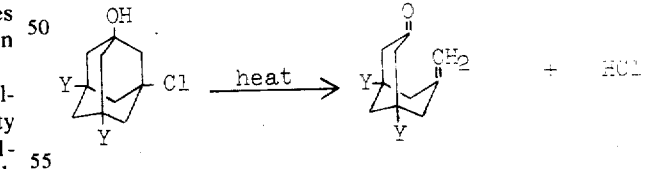

The pyrolysis reaction preferably is carried out in vapor phase, but pyrolysis in the liquid or even the solid phase is not precluded. Temperature conditions within the pyrolysis zone are maintained sufficiently high, in coordination with any catalytic conditions present, for pyrolysis to take place, preferably at a reasonable rate, and not so high as to result largely in unwanted products, and preferably not so high as to result in significant formation of products other than the desired product or products. With the foregoing in mind, temperatures within the range of 150°–750°C. can be used, though 230°–600°C. is a preferred range.

Pyrolysis of the starting compound preferably is carried out in the presence of a solid packing material or contact mass which provides a large surface area. Examples of suitable packing materials are glass wool or powder, sand, alumina, bauxite, diatomaceous earth, silica gel, ceramic packings and the like. The use of such materials generally permits a lowering of temperature conditions for the same results, perhaps due to catalytic effects. Alumina, for example, evidently exerts a catalytic effect and can best be used at relatively low temperatures such as 230°–350°C.

For purpose of describing the invention in conjunction with the drawing, the feed material will be considered to be an adamantane diol, for example, 1,3-dihydroxy-5,7-dimethyladamantane (referred to herein as DHDMA) which yields 3,7-dimethyl-5-methylene-1-ketobicyclo[3.3.1]nonane as the desired product and water as by-product. The ketone is normally a liquid that boils considerably above the boiling point of water. The starting diol (DHDMA) is normally a white solid which readily sublimes above its melting point (about 217°C.)

With reference to the drawing, the pyrolysis zone is illustrated in the form of an elongated column 10 containing a bed of granular material 11, such as alumina. Means provided for feeding the starting diol (DHDMA) comprise a hopper 12 for holding a supply of the powdered feed material and a motorized screw conveyor 13 through which the powder is fed into the center of column 10 beneath the bed 11. Hot inert gas, such as nitrogen, is circulated through the column by means of a blower 14, from which it passes through a heater 15 and line 16 into the bottom of column 10. Valved make-up line 17 is provided for supplying additional inert gas as needed.

The inert gas is circulated through the system at such a rate and its temperature is raised by means of heater 15 to such a level as to supply the heat necessary to maintain the desired pyrolysis temperature in bed 11 and also to vaporize the diol powder being fed via screw conveyor 13 into the column. The powder as it passes from the end of the screw conveyor tends to drop within column 10 but is maintained in fluidized form by the rising stream of hot inert gas which readily causes sublimation as the diol particles are heated. The mixture carrying the vaporized diol then passes into the contact mass 11 wherein pyrolysis occurs yielding the desired ketone and water as by-product. The optimum temperature within the pyrolysis zone will vary depending upon the particular packing material used in bed 11 and its catalytic activity but usually will be within the range of 230°–600°C.

Products from the pyrolysis zone pass from the top of column 10 via line 18 into a partial condenser 19 wherein the temperature is reduced sufficiently to condense the ketone product while permitting the water by-product to remain in vapor state. For example, condenser 19 is operated so as to reduce the temperature of the reaction product mixture to within the range of 120°–200°C. The partially condensed product passes through line 20 to product receiving tank 21 from which the ketone product can be withdrawn via line 22.

The circulating gas containing water vapor passes from tank 21 through line 23 to condenser 24 which reduces the temperature sufficiently to drop out most of the water. The cooled material passes through line 25 into tank 26 from which the collected water is removed through line 27, the uncondensed gas then recirculating through line 28 to blower 14.

As an alternative procedure for recovering the ketone product, the hot inert gas containing the product mixture in line 18 can be cooled in one step sufficiently to condense both the ketone and the water, which can then be separated from each other by decantation.

The following examples are given by way of illustration.

EXAMPLE I

A length of 8 mm. O.D. glass tubing was arranged as a flow reactor with a 15 inch long intermediate portion serving as a heating zone and positioned within an electrically controlled oven. The system was arranged so that a receptacle containing a batch of the starting adamantane diol could be inserted into the intermediate portion. The tube was first swept with nitrogen, then the receptacle containing 1,3-dihydroxy-5,7-dimethyladamantane (DHDMA) was moved into the heating zone, and a moderate nitrogen flow was maintained to sweep through the reactant and its reaction products. An air-cooled downstream portion of the tube acted as a condenser but allowed water formed during the pyrolysis to pass through, any uncondensed material (other than nitrogen) then being collected in a subsequent zone cooled with solid carbon dioxide. The tube contained no packing. With the operating temperature of the pyrolysis zone at about 400°C., the product mixture collected was largely unreacted charge material together with a small amount (estimated at less than 10%) of the corresponding ketone, i.e., 3,7-dimethyl-5-methylene-1-ketobicyclo[3.3.1]nonane.

EXAMPLE II

In a rerun of Example I, but with temperature conditions raised to 580°C., the condensed product mixture contained approximately 60% corresponding ketone and 40% unreacted charge by weight.

EXAMPLE III

In this run the same apparatus, procedure and charge material were used as in previous runs, except that the 15-inch heated portion of the tube was packed over a length of approximately 12 inches with glass wool. Operating with temperature conditions at 400°C., approximately 60% of the condensed product mixture was the corresponding ketone.

EXAMPLE IV

In a rerun of Example III, but with temperature conditions raised to 600°C., the condensed product mixture was substantially entirely the corresponding ketone.

EXAMPLE V

In this run the charge material, procedure and apparatus of previous runs were used, except that the heated portion of the tube was packed over a length of approximately 8 inches with ordinary clean sand. Operating with temperature conditions at 400°C., the condensed product mixture was found to be approximately 90% corresponding ketone.

In the runs of Examples I to V the other product was water, and the material balance was quantitative within experimental error.

The better results obtained in Examples III and V as compared to Example I, that is when operating at 400°C., indicate that besides better heat exchange contact with the material being pyrolyzed, a mild catalytic effect was also exerted, promoting the desired pyrolysis and considerably increasing the yield of the desired ketone product.

The results of strong catalytic effect are demonstrated in the following example.

EXAMPLE VI

In this run the same charge material, procedure and apparatus were used, except that the heated zone portion of the tube contained only two inches of chromagraphic grade alumina (Al$_2$O$_3$) as packing. Before introduction of the DHDMA the alumina was activated by heating in a stream of nitrogen at 400°C. for 2 hours. Then the DHDMA was introduced while continuing to maintain the nitrogen stream temperature at 400°C. The only product isolated was mesitylene, clearly indicating that pyrolysis was carried too far. In such cases lower temperatures (e.g., 230°-350°C.) should be employed, and/or a lower contact time or less active packing.

EXAMPLE VII

Another run was made like Example VI except that the tube contained four inches of chromagraphic grade alumina which was activated under the same conditions (400°C.), following which the temperature was dropped to and maintained at about 250°C. to effect pyrolysis of the DHDMA. The condensed product was substantially all the corresponding ketone except for a trace of mesitylene and a small amount (<2%) of unreacted DHDMA. This run indicates that good conversion to the unsaturated bicyclic ketone can be obtained by utilizing activated alumina at 250°C. to effect the pyrolysis.

EXAMPLE VIII

In this run the charge material was 1-acetoxy-3-hydroxy-5,7-dimethyladamantane which was prepared by the partial esterification of 1,3-dihydroxy-5,7-dimethyladamantane with acetic anhydride. The pyrolysis took place at 220°C. in a zone comprised of a 6 foot long copper tube of ¼ inch inner diameter packed with diatomaceous earth. The product was the corresponding ketone, as in Example VII, and was obtained in a yield equivalent to at least most of the 1-acetoxy-3-hydroxy-5,7-dimethyladamantane charged.

Substitution in the above examples of other charge materials as herein specified and of other pyrolytic conditions to which this invention relates yields analogous results.

The invention claimed is:

1. A process for the production of unsubstituted 5-methylene-1-ketobicyclo[3.3.1]nonane or alkyl-substituted 5-methylene-1-ketobicyclo[3.3.1]nonane which comprises subjecting a compound of the formula:

HO — A — B wherein A represents a divalent hydrocarbon moiety consisting of the adamantane nucleus with 0-3 alkyl substituents containing a total of not more than 20 alkyl carbon atoms; wherein B is a bridgehead substituent from the group consisting of hydroxy, chloro, bromo and

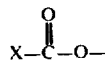

in which X is hydrogen, alkyl, aryl or cycloalkyl, each such X having 0-10 carbon atoms; and wherein HO— is a bridgehead substituent; remaining substituents on A being hydrogen; to pyrolysis at a temperature in the range of 150°-750°C. effective to produce the corresponding 5-methylene-1-ketobicyclo-[3.3.1]nonane.

2. The process of claim 1 in which said temperature is in the range of 230°-600°C. and the pyrolysis reaction is effected in the presence of a solid contact mass providing a large surface area.

3. The process of claim 1 wherein A has two alkyl substituents each occupying a bridgehead position and together containing not more than 10 carbon atoms.

4. The process of claim 3 wherein each alkyl substituent on A contains 1 or 2 carbon atoms.

5. The process of claim 4 wherein each alkyl substituent on A contains 1 carbon atom.

6. The process of claim 1 wherein B is hydroxy.

7. The process of claim 6 wherein A has two alkyl substituents each occupying a bridgehead position and together containing not more than 10 carbon atoms.

8. The process of claim 1 wherein B is halo.

9. The process of claim 1 wherein B is

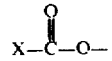

in which X is hydrogen, alkyl, aryl or cycloalkyl, and in which X contains 0-10 carbon atoms.

10. The process of claim 9 wherein X contains 0-5 carbon atoms.

11. The process of claim 9 wherein X is methyl.

12. The process of claim 1 wherein B is hydroxy and said temperature is in the range of 230°-600°C.

13. The process of claim 12 wherein the pyrolysis reaction is effected in the presence of a solid contact mass providing a large surface area.

14. The process of claim 13 wherein said contact mass is alumina and said temperature is in the range of 230°-350°C.

15. The process of claim 14 wherein the feed compound is 1,3-dihydroxy-5,7-dimethyladamantane and the product is 3.7-dimethyl-5-methylene-1-ketobicyclo[3.3.1]nonane.

16. The process of claim 1 wherein the feed compound is 1,3-dihydroxy-5,7-dimethyladamantane and the product is 3,7-dimethyl-5-methylene-1-ketobicyclo[3.3.1]nonane.

* * * * *